US012620081B2

(12) United States Patent
Nishihata et al.

(10) Patent No.: US 12,620,081 B2
(45) Date of Patent: May 5, 2026

(54) SEMICONDUCTOR PATTERN OVERLAY ERROR DETERMINATION USING WEIGHTING MAP BASED ON OPTICAL TRANSMISSION DEGREE THROUGH OVERLYING LAYER

(71) Applicant: Hitachi High-Tech Corporation, Tokyo (JP)

(72) Inventors: Takahiro Nishihata, Tokyo (JP); Atsushi Miyamoto, Tokyo (JP); Takuma Yamamoto, Tokyo (JP); Yasunori Goto, Tokyo (JP)

(73) Assignee: Hitachi High-Tech Corporation, Tokyo (JP)

( * ) Notice: Subject to any disclaimer, the term of this patent is extended or adjusted under 35 U.S.C. 154(b) by 201 days.

(21) Appl. No.: 18/237,975

(22) Filed: Aug. 25, 2023

(65) Prior Publication Data

US 2024/0112322 A1 Apr. 4, 2024

(30) Foreign Application Priority Data

Sep. 26, 2022 (JP) .................................. 2022-153123

(51) Int. Cl.
G06T 7/00 (2017.01)
G06T 5/50 (2006.01)
(Continued)

(52) U.S. Cl.
CPC .............. G06T 7/0006 (2013.01); G06T 5/50 (2013.01); G06T 7/50 (2017.01); G06T 11/203 (2013.01);
(Continued)

(58) Field of Classification Search
CPC ....... G03F 7/70633; G06T 2207/10056; G06T 2207/30148; G06T 7/001; G06V 10/60
See application file for complete search history.

(56) References Cited

U.S. PATENT DOCUMENTS

2008/0029913 A1 * 2/2008 Taylor ................. G03F 7/70633
257/797
2011/0139982 A1 * 6/2011 Kijima ................... G01B 15/00
250/307
(Continued)

FOREIGN PATENT DOCUMENTS

JP 2011-90470 A 5/2011
JP 2012-177961 A 9/2012
(Continued)

OTHER PUBLICATIONS

Z.-F. Gan and X.-C. Xu, "Study and Improvement on Measurement Accuracy of Image Based Overlay," 2022 China Semiconductor Technology International Conference (CSTIC), Shanghai, China, 2022, pp. 1-3, doi: 10.1109/CSTIC55103.2022.9856844 (Year: 2022).*
(Continued)

*Primary Examiner* — Michael Robert Cammarata
(74) *Attorney, Agent, or Firm* — Crowell & Moring LLP

(57) ABSTRACT

An image of a sample captured by a microscope includes a first layer template image and a second layer template image indicating pattern shapes of a first layer and a second layer. Pattern matching of the second layer is performed based on the second layer template image to acquire a second position deviation amount related to the second layer and an area recognized as the second layer. Pattern matching processing of the first layer is performed based on a first layer consideration range, the first layer template image, and the image to acquire a first position deviation amount related to the first layer and an area recognized as the first layer on the image to be measured. An overlay is measured based on the second position deviation amount and the first position deviation amount.

20 Claims, 9 Drawing Sheets

(51) Int. Cl.

| | |
|---|---|
| *G06T 7/50* | (2017.01) |
| *G06T 11/20* | (2006.01) |
| *G06V 10/60* | (2022.01) |
| *G06V 10/74* | (2022.01) |

(52) U.S. Cl.
CPC ............ *G06V 10/60* (2022.01); *G06V 10/761* (2022.01); *G06T 2207/10056* (2013.01); *G06T 2207/20216* (2013.01); *G06T 2207/30148* (2013.01)

(56) References Cited

U.S. PATENT DOCUMENTS

| | | | |
|---|---|---|---|
| 2012/0207397 A1 | 8/2012 | Nagatomo et al. | |
| 2014/0016854 A1 | 1/2014 | Nagatomo et al. | |
| 2014/0375793 A1* | 12/2014 | Harada ................... | G06T 7/001 |
| | | | 345/634 |
| 2016/0056014 A1 | 2/2016 | Yamamoto et al. | |
| 2017/0256465 A1* | 9/2017 | Van Leest ............. | G03F 9/7003 |
| 2017/0322021 A1* | 11/2017 | Takagi ................... | G06V 10/24 |
| 2019/0017817 A1* | 1/2019 | Fukunaga ............. | G01B 15/00 |
| 2019/0033728 A1* | 1/2019 | Takagi ............... | G06V 10/7788 |
| 2021/0055098 A1* | 2/2021 | Yamaki ................ | G01N 23/203 |
| 2022/0301815 A1* | 9/2022 | Yamamoto ............ | H01J 37/265 |
| 2023/0408401 A1* | 12/2023 | Son ........................ | G01B 11/24 |

FOREIGN PATENT DOCUMENTS

| | | | | | |
|---|---|---|---|---|---|
| JP | 2013-168595 | A | | 8/2013 | |
| JP | 6839718 | B2 * | 3/2021 | ........... | H01L 21/308 |
| KR | 10-2015-0140331 | A | | 12/2015 | |
| KR | 20150140331 | A * | 12/2015 | ......... | G03F 7/70633 |
| KR | 10-2018-0095635 | A | | 8/2018 | |

OTHER PUBLICATIONS

Y. T. Lin, C. C. Hsu and S.-S. Tseng, "A Semiconductor Photolithography Overlay Analysis System Using Image Processing Approach," Ninth IEEE International Symposium on Multimedia Workshops (ISMW 2007), Taichung, Taiwan, 2007, pp. 63-69, doi: 10.1109/ISM.Workshops.2007.16. (Year: 2007).*

English translation of JP-6839718-B2 (Year: 2021).*

Korean-language Office Action issued in Korean Application No. 10-2023-0103992 dated Feb. 19, 2025 with English translation (17 pages).

Japanese-language Office Action issued in Japanese Application No. 2022-153123 dated Dec. 23, 2025, with English translation (6 pages).

* cited by examiner

FIG. 5B

| | | UPPER LAYER | | |
|---|---|---|---|---|
| | | 3rd layer | 2nd layer | 1st layer |
| LOWER LAYER | 3rd layer | —— | —— | —— |
| | 2nd layer | 0.5 | — | — |
| | 1st layer | 0.0 | 0.5 | — |

701

| | | UPPER LAYER | | |
|---|---|---|---|---|
| | | 3rd layer | 2nd layer | 1st layer |
| LOWER LAYER | 3rd layer | — | — | — |
| | 2nd layer | 0.5 | — | — |
| | 1st layer | 0.0 | 0.5 | — |

SEMICONDUCTOR PATTERN OVERLAY ERROR DETERMINATION USING WEIGHTING MAP BASED ON OPTICAL TRANSMISSION DEGREE THROUGH OVERLYING LAYER

BACKGROUND OF THE INVENTION

1. Field of the Invention

The present invention relates to a measurement device of a semiconductor pattern and a computer program, particularly to an overlay measurement device that measures a dimension of a pattern and an overlay error of patterns between a plurality of layers based on an image obtained by a charged particle beam device or the like.

2. Description of Related Art

Patterns manufactured by recent semiconductor processes become finer and have a multilayer structure, and there is a demand for reducing overlay errors (hereinafter simply referred to as overlay) of patterns throughout a plurality of layers of an exposure device. Therefore, it is considered that the importance of measuring the overlay with high precision and feeding back to the exposure device will become more important.

A scanning electron microscope (SEM), which is a type of charged particle beam device, is widely used as means of such overlay measurement. The SEM outputs a captured image (hereinafter, referred to as an image to be measured) by detecting reflected electrons and the like obtained when an electron beam is irradiated onto a semiconductor sample. Overlay measurement becomes possible by performing appropriate image processing on the image to be measured and calculating a position of a pattern on each layer to be a target of the overlay measurement.

There are mainly two methods for calculating a position of a pattern on each layer by image processing. One is a method of performing pattern matching for each layer between a template image and an image to be measured and calculating the position where the matching score becomes maximum as the position of the pattern of each layer. The other is a method of detecting edges of the pattern on each layer by focusing on the luminance change at an edge portion of the pattern on the image to be measured and calculating a center position of the edges as the position of the pattern on each layer. Which method is better depending on the image to be measured. However, in general, the latter method is effective for cases where the edges of the pattern to be measured are sharp, and conversely, the former method is effective for cases where the edges of the pattern to be measured are unclear or some of the edges of the pattern in a layer of interest are hidden by other layers. The present invention is directed to the former, and the following description is based on pattern matching processing of the former.

In general, patterns of a plurality of layers are seen through the overlay image to be measured. Thereby, there are cases where a part of the pattern in the lower layer to be measured is hidden by the upper layer, resulting in a lower matching score and matching failure, and cases where the pattern is erroneously matched with a pattern in an untargeted layer. To reduce such pattern matching failures, processing of excluding information on layers unrelated to the layer to be measured during pattern matching calculation is effective.

There are JP2013-168595A and JP2011-90470A as related art in the technical field. JP2013-168595A discloses performing area division processing on an upper layer pattern and a lower layer pattern depending on luminance information with respect to each of a template image and an image to be measured and performing pattern matching between the upper layer pattern areas and between the lower layer pattern areas for each of the template image and the image to be measured. JP2011-90470A discloses a method of using design data of a sample to be measured to generate a mask processing area that is not taken into consideration during pattern matching by using edge information of the design data. Both methods can reduce failures in pattern matching by not using layer information unrelated to the layer to be measured.

According to the multi-layered structuring of the semiconductor pattern, there are cases where low-energy electron beams in the related art cannot reveal the pattern of the lower layer, and thus a high-acceleration SEM that irradiates with high-energy electron beams (for example, 15 keV or higher) have begun to be used for overlay measurements, in recent years. In the image to be measured by the high-acceleration SEM, there are cases where the lower layer can be seen through the upper layer due to the height of energy of the electron beam.

For the image to be measured in which the overlapping portion of the upper layer and the lower layer is transmissive, if the area division or the mask processing disclosed in JP2013-168595A or JP2011-90470A is carelessly performed to remove information of the upper layer area at the time of pattern matching of the lower layer, the information of the lower layer that transmits through the upper layer is erased, and thus a pattern matching success rate may be rather deteriorated.

SUMMARY OF THE INVENTION

In view of the above problems, an object of the present invention is to improve a success rate of pattern matching for each layer as a target of a complicated multi-layer structure pattern and a success rate of overlay measurement based on the pattern matching.

An example of the present invention is a semiconductor observation system including a microscope and a processor that measures an overlay between a first layer that is a certain layer of a sample formed with two or more layers and a second layer that is one or more layers above the first layer, in which the processor acquires an image to be measured of the sample that is captured by the microscope, acquires a first degree that indicates a degree in which the second layer transmits the first layer, acquires a first layer template image indicating a pattern shape of the first layer and a second layer template image indicating a pattern shape of the second layer, performs pattern matching processing of the second layer based on the second layer template image and the image to be measured to acquire a second position deviation amount related to the second layer and an area recognized as the second layer on the image to be measured, the second position deviation amount being a position deviation amount between the second layer template image related to the second layer and the image to be measured, determines a first layer consideration range that is a consideration range of the image to be measured in pattern matching processing of the first layer based on the first degree and the area recognized as the second layer, performs pattern matching processing of the first layer based on the first layer consideration range, the first layer template image, and the image to be measured, to acquire a first position deviation amount related to the first layer and an area recognized as the first layer on the image to be measured, the first position deviation amount being a position deviation amount between the first layer template image related to the first layer and the image to be measured, and measures an overlay based on the second position deviation amount and the first position deviation amount.

According to the present invention, it is possible to improve a success rate of pattern matching of each layer as a target of a complicated multi-layer structure pattern and a success rate of overlay measurement based on the pattern matching.

BRIEF DESCRIPTION OF THE DRAWINGS

FIG. 5B is a diagram illustrating the image to be measured for describing the overlay measurement processing in Example 1;

DESCRIPTION OF EMBODIMENTS

Hereinafter, examples of the present invention are described with reference to the drawings.

Example 1

First, details of the problems to be solved by the present invention are described. As described above, in the image to be measured by the high-acceleration SEM, there are cases where the lower layer can be seen through the upper layer due to the height of energy of an electron beam. Examples of a case where the upper layer transmits the lower layer in the image to be measured and a case where the upper layer does not transmit the lower layer are described with reference to FIGS. 1A and 1B.

Figure 1A:
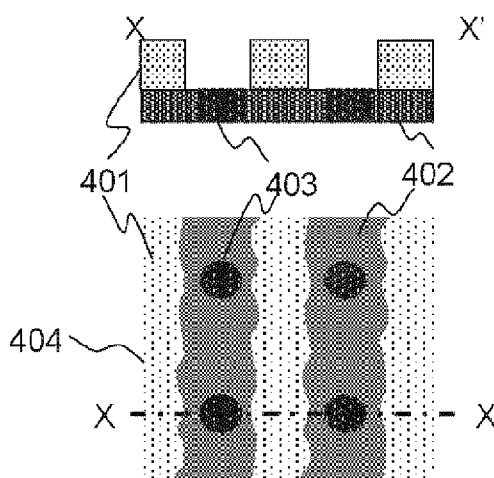
FIG. 1A is a diagram illustrating a problem that an upper layer and a lower layer are transmissive in an image to be measured by a SEM.
Figure 1A:
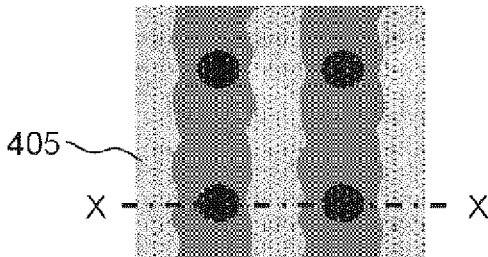
Figure 1B:
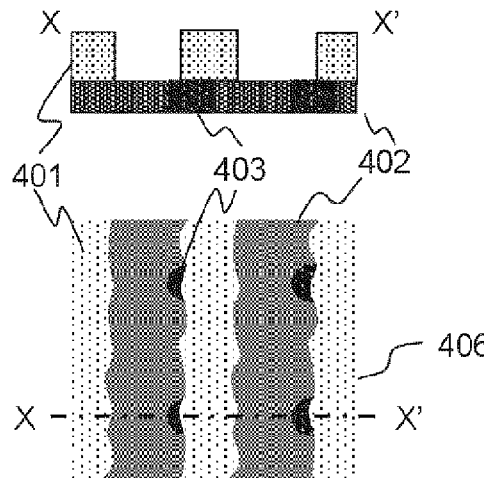
FIG. 1B is a diagram illustrating a problem that the upper layer and the lower layer are transmissive in the image to be measured by the SEM.
Figure 1B:
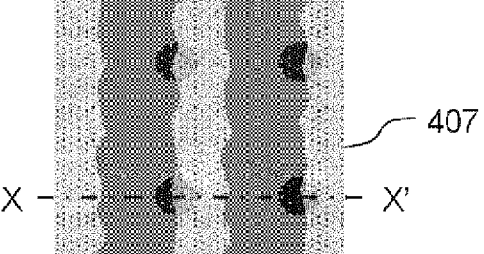

In FIGS. 1A and 1B, middle and lower drawings illustrate the images to be measured, and upper drawings illustrate cross-sectional views of an overlay measurement sample at a position indicated by X-X' on the image to be measured. As illustrated in the cross-sectional views on the upper drawings, the sample illustrated in FIGS. 1A and 1B includes an upper layer made of a line pattern 401 in a vertical direction, and a lower layer made of an underlying pattern 402 that is a base of the line pattern 401 and a hole pattern 403 positioned in a base between lines.

FIG. 1A illustrates an ideal layout without an overlay between the upper layer and the lower layer. In FIG. 1A, in 404 and 405 of the images to be measured, the entire patterns 401 to 403 are illustrated, though there is a difference in pattern contrast. On the other hand, FIG. 1B illustrates an example in which there is an overlay between the line pattern 401 of the upper layer and the hole pattern 403 of the lower layer. As illustrated in the cross-sectional view on the upper drawing of FIG. 1B, it is configured that the hole pattern 403 slips under the line pattern 401 of the upper layer. Here, in 406 of the image to be measured, the information of a portion covered with the upper layer over the hole pattern 403 of the lower layer is lost. Meanwhile, in 407 of the image to be measured, a portion covered with the upper layer over the hole pattern 403 of the lower layer is transmitted through the line pattern 401 of the upper layer.

As such, for the image to be measured in which a degree in which the upper layer transmits the lower layer, that is, a luminance difference from the upper layer in the overlapping portion in the image to be measured is different, if information of the upper layer area at the time of pattern matching of the lower layer is erased by carelessly performing area division or mask processing disclosed in JP2013-168595A or JP2011-90470A, the information of the lower layer transmitted through the upper layer is erased, and a pattern matching success rate may be rather deteriorated.

Therefore, in the present example, a method of adaptively changing a consideration range at the time of pattern matching calculation is applied based on the degree in which the upper layer transmits the lower layer, that is, the luminance difference of each layer at an overlapping portion in the image to be measured. Here, the degree in which the upper layer transmits the lower layer changes according to an image capturing condition such as a structure or a material of the sample to be measured, or an acceleration voltage of the high-acceleration SEM, and thus it is difficult to assume the degree at the stage before capturing the image. Therefore, the degree in which the upper layer transmits the lower layer can be input and adjusted as a processing condition of the pattern matching processing by the user after confirming the image to be measured.

In addition to the measurement of an overlay error of the patterns between the upper layer and the lower layer described above, examples of the overlay measurement include measuring a position deviation amount between an original pattern and a pattern formed by etching. Here, the luminance change occurs not by the transmission degree but by etching, and a problem may occur as in the case where the upper layer transmits the lower layer as described above.

Figure 2A:
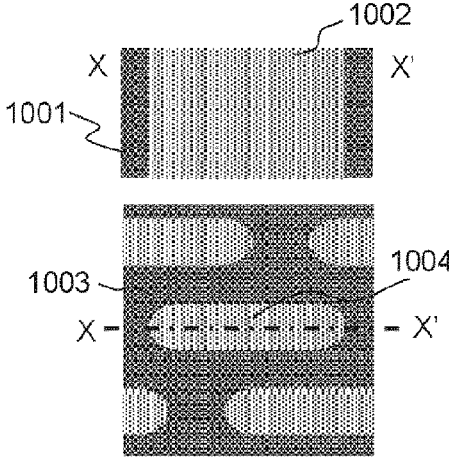
FIG. 2A is a diagram illustrating a problem of a luminance change by etching the image to be measured of the SEM.
Figure 2B:
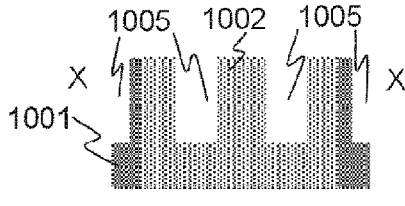
FIG. 2B is a diagram illustrating a problem of the luminance change by etching the image to be measured of the SEM.
Figure 2B:
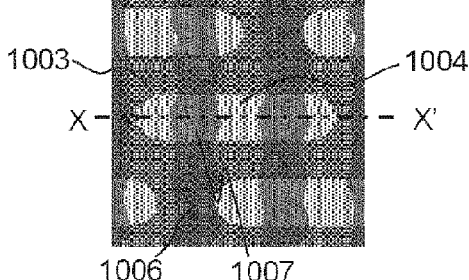
Figure 2C:
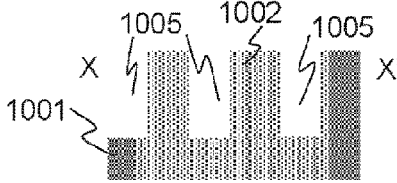
FIG. 2C is a diagram illustrating a problem of the luminance change by etching the image to be measured of the SEM.
Figure 2C:
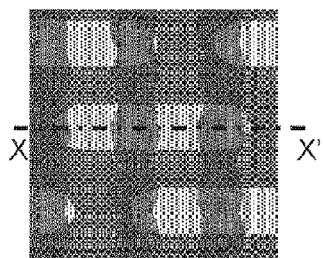

FIGS. 2A, 2B, and 2C are diagrams illustrating problems of the luminance change by etching in the image to be measured of the SEM. In FIGS. 2A, 2B, and 2C, the lower drawings illustrate the images to be measured, and the upper drawings illustrate the cross-sectional views of the overlay measurement sample at the position indicated by X-X' on the image to be measured. The samples exemplified in FIGS. 2A, 2B, and 2C are configured with two materials of an insulating material 1001 and a non-insulating material 1002.

FIG. 2A illustrates a cross-sectional view of the sample before etching and an example of the image to be measured. On the image to be measured, the insulating material 1001 appears as a dark background such as a pattern 1003, and the non-insulating material 1002 appears as a bright foreground such as a pattern 1004. If groove patterns 1005 are formed by etching at equal intervals in the sample, the overlay measurement samples as illustrated in FIGS. 2B and 2C are obtained. FIG. 2B illustrates an ideal layout example, and FIG. 2C illustrates an example in which the groove pattern 1005 is formed in a deviated manner. As illustrated in the cross-sectional view and the example of the image to be measured of FIG. 2B, in an area 1006 in which the groove pattern is etched to the insulating material 1001 and an area 1007 in which the groove pattern is etched to the non-insulating material 1002, both are darker than the original luminance of the patterns 1003 and 1004. As illustrated in FIG. 2C, also in the case where the groove pattern 1005 is formed in a deviated manner, the luminance on the image to be measured changes according to the overlapping relationship of the insulating material 1001 or the non-insulating material 1002 with the groove pattern 1005.

As a countermeasure against such case where the luminance changes due to etching, a method of adaptively changing the consideration range at the time of pattern matching calculation between etched pattern area and the other areas similarly to the image to be measured in which the upper layer transmits the lower layer as described above is considered to be effective. Hereinafter, when the degree of transmission is described in the present example, the degree of transmission includes the degree of luminance change due to etching.

Figure 3:
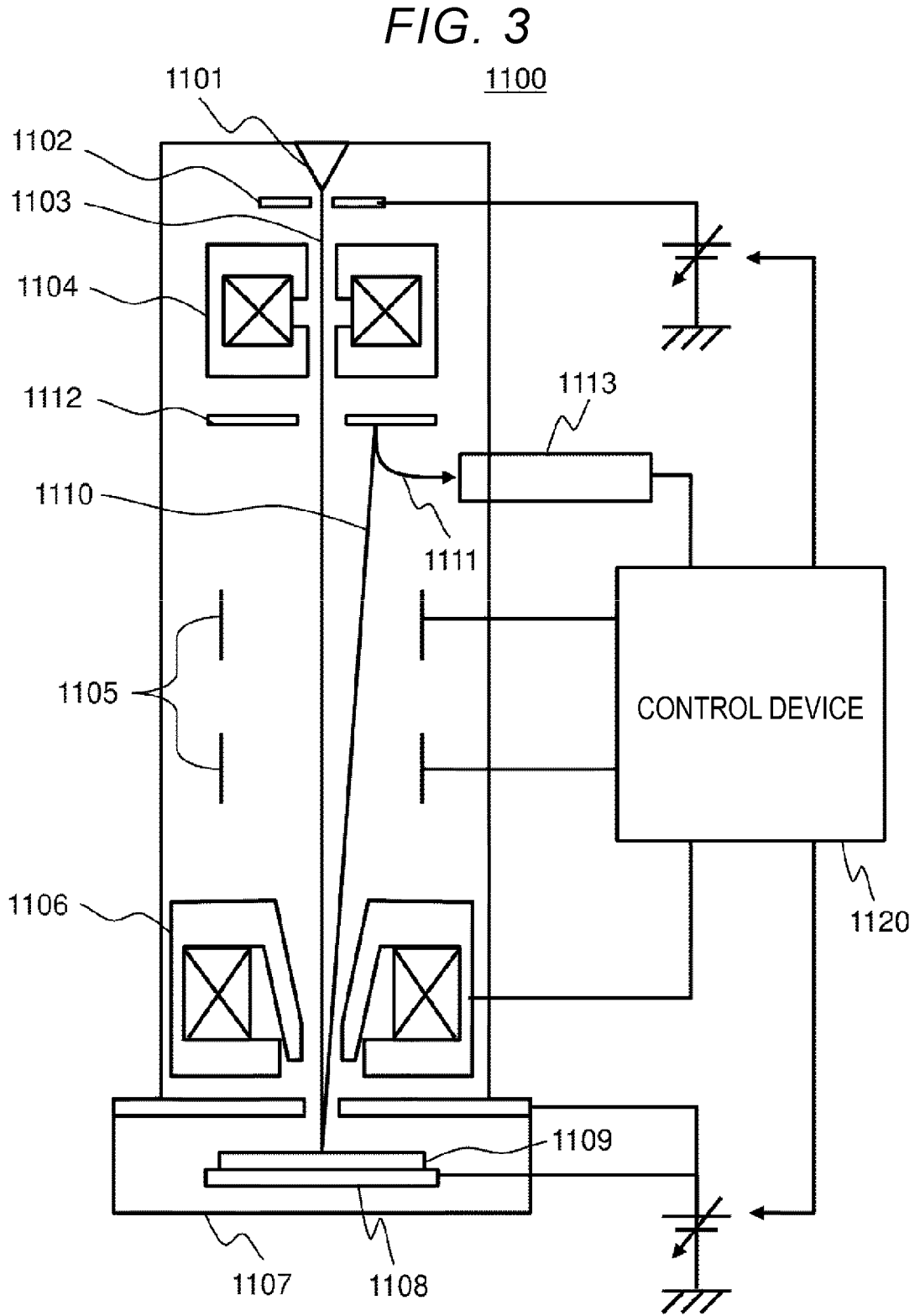
FIG. 3 is a diagram illustrating an outline of the SEM.

FIG. 3 is a diagram illustrating an outline of a SEM that is the premise of the present example. In FIG. 3, in a SEM 1100, electron beams 1103 extracted by an extraction electrode 1102 from an electron source 1101 and accelerated by an acceleration electrode (not illustrated) are condensed by a condenser lens 1104 that is a form of focusing lens, and one-dimensionally or two-dimensionally scan a sample 1109 by a scanning deflector 1105. The electron beams 1103 are decelerated by a negative voltage applied to an electrode built into a sample stage 1108 and are simultaneously focused by the lens action of an objective lens 1106 to be irradiated to the sample 1109.

When the sample 1109 is irradiated with the electron beam 1103, electrons 1110 such as secondary electrons and backscattered electrons are emitted from the corresponding irradiation site. The emitted electrons 1110 are accelerated in an electron source direction by an acceleration action based on a negative voltage applied to a sample, collide with a conversion electrode 1112, and generate secondary electrons 1111. The secondary electrons 1111 emitted from the conversion electrode 1112 are captured by a detector 1113, and the output of the detector 1113 is changed by the amount of the captured secondary electrons. According to the output, the luminance of the display device (not illustrated) is changed. For example, when the secondary electron image is formed, an image of the scanning area is formed by synchronizing the deflection signal to the scanning deflector 1105 and the output of the detector 1113.

The SEM exemplified in FIG. 3 is a device that can apply a high voltage (for example, 15 kV or more) to the acceleration electrode (not illustrated) and can cause the electron beams to reach an embedded pattern or the like that is not exposed on the sample surface by irradiation with electron beams having high acceleration. FIG. 3 illustrates an example in which the electrons emitted from the sample are once converted by the conversion electrode and then detected. However, it is not limited to such a configuration. For example, it is possible to dispose a detection plane of an electron multiplier or a detector on the trajectory of accelerated electrons. The conversion electrode 1112 and the detector 1113 do not need to be one, and a configuration having a plurality of detection planes divided in the azimuth and elevation directions with respect to the optical axis and detectors corresponding to the respective detection planes may be employed. In such configuration, it is possible to simultaneously obtain images to be measured in the same number as the number of detectors in one imaging capturing.

A control device 1120 controls each configuration of the SEM, and includes a function of forming an image based on the detected electrons and a function of measuring a pattern width of a pattern formed on a sample based on intensity distribution of a detection electron referred to as a line profile. The control device 1120 includes a SEM control device that mainly controls the optical conditions of the SEM and a signal processing device that performs signal processing of the detection signal obtained by the detector 1113. The SEM control device includes a scan control device for controlling beam scan condition (such as a direction or a speed). In the control device 1120, a storage medium (not illustrated) is included, and a program for causing a computer (CPU) to execute image processing or calculation as described below is stored.

Figure 4:
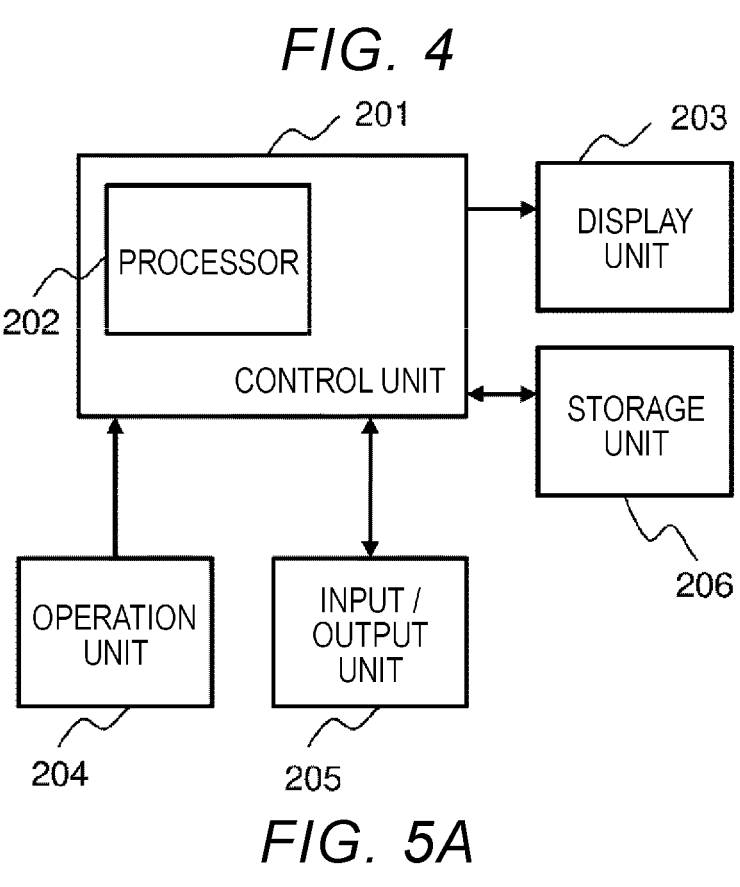
FIG. 4 is a block diagram illustrating an outline of an overlay measurement device in Example 1.

FIG. 4 is a block diagram illustrating an outline of the overlay measurement device in the present example. The overlay measurement device acquires the image to be measured from the image generation device such as the SEM exemplified in FIG. 3 and performs overlay measurement. The image to be measured of the overlay measurement device may be acquired by receiving from the image generation device such as the SEM by communication, may be acquired via a portable memory such as a universal serial bus (USB, registered trademark) memory, or may be acquired by reading the image to be measured stored in a built-in storage unit in advance. A device configured with the SEM illustrated in FIG. 3 and the overlay measurement device illustrated in FIG. 4 is referred to as a semiconductor observation system.

In FIG. 4, the overlay measurement device includes an input/output unit 205 that inputs the image to be measured and outputs a measurement result, an operation unit 204 that inputs required information such as the degree in which the upper layer transmits the lower layer from a graphical user interface (GUI) screen, a storage unit 206 that stores an overlay measurement condition used for the overlay measurement such as the image to be measured, the template image, and the degree in which the upper layer transmits the lower layer, a control unit 201 that includes a processor 202 executing calculation processing required in the overlay measurement by software processing realized by the execution of a program (hereinafter, referred to as an overlay measurement program) based on the image information input from the input/output unit 205, the information such as the measurement condition input from the operation unit 204 or the storage unit 206, and a display unit 203 that displays an overlay measurement result, a GUI image, and the like obtained based on the input image to be measured, or the image to be measured.

Figure 5A:
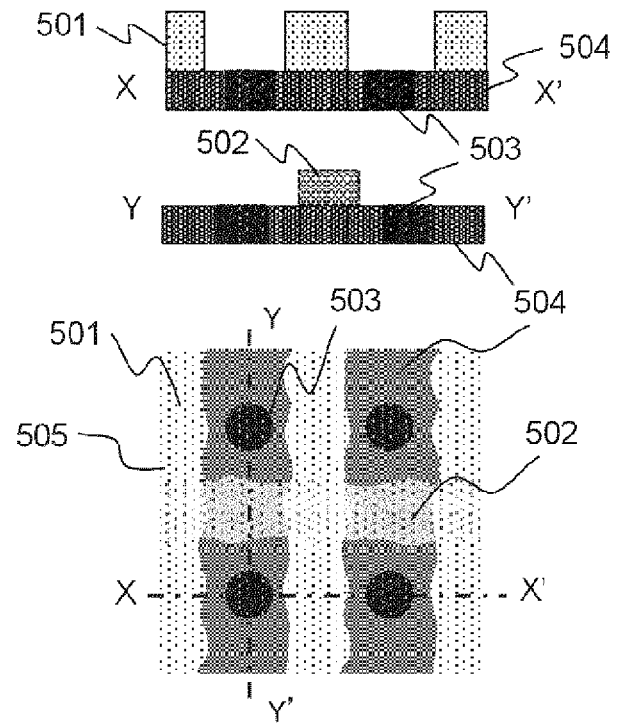
FIG. 5A is a diagram illustrating the image to be measured for describing overlay measurement processing in Example 1.
Figure 5B:
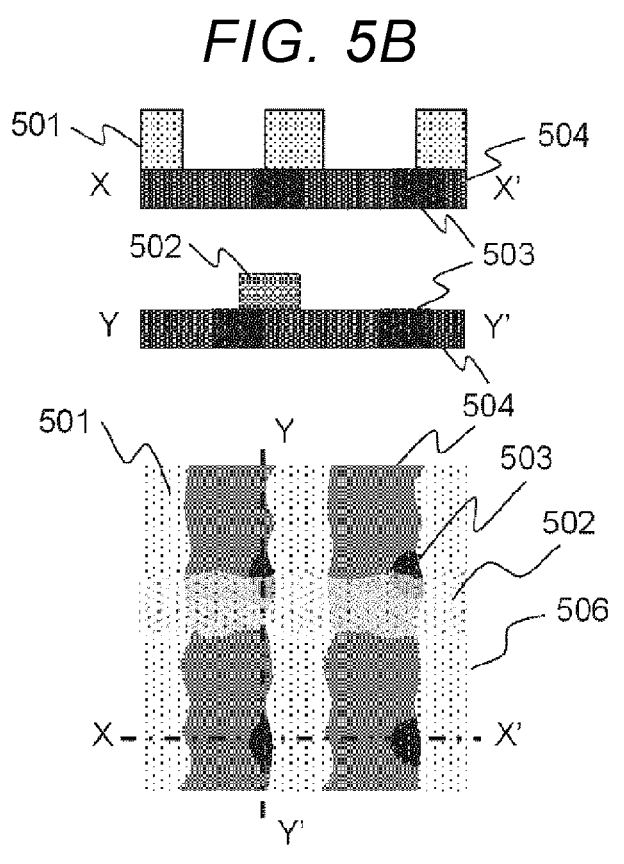

Next, the overlay measurement processing in the present example is described. To simplify the description, as an example of the image to be measured, the image to be measured of the sample having a three-layer structure illustrated in FIGS. 5A and 5B is used. The sample illustrated in FIGS. 5A and 5B is configured with a vertical direction line pattern 501 of a third layer, a horizontal direction line pattern 502 of a second layer, a hole pattern 503 of a first layer, and an underlayer 504 in order from the upper layer.

FIG. 5A illustrates an example of the image to be measured in an ideal layout when there is no overlay. FIG. 5B illustrates an example of the image to be measured in a layout in which the horizontal direction line pattern 502 of the second layer is deviated in the upper direction, and the hole pattern 503 of the first layer is deviated in the lower right direction with respect to the vertical direction line pattern 501 of the third layer. In the example of the image to be measured, the area of the vertical direction line pattern 501 of the third layer transmits the horizontal direction line pattern 502 of the second layer but does not transmit the hole pattern 503 of the first layer. The area of the horizontal direction line pattern 502 of the second layer transmits the hole pattern 503 of the first layer.

Figure 6:
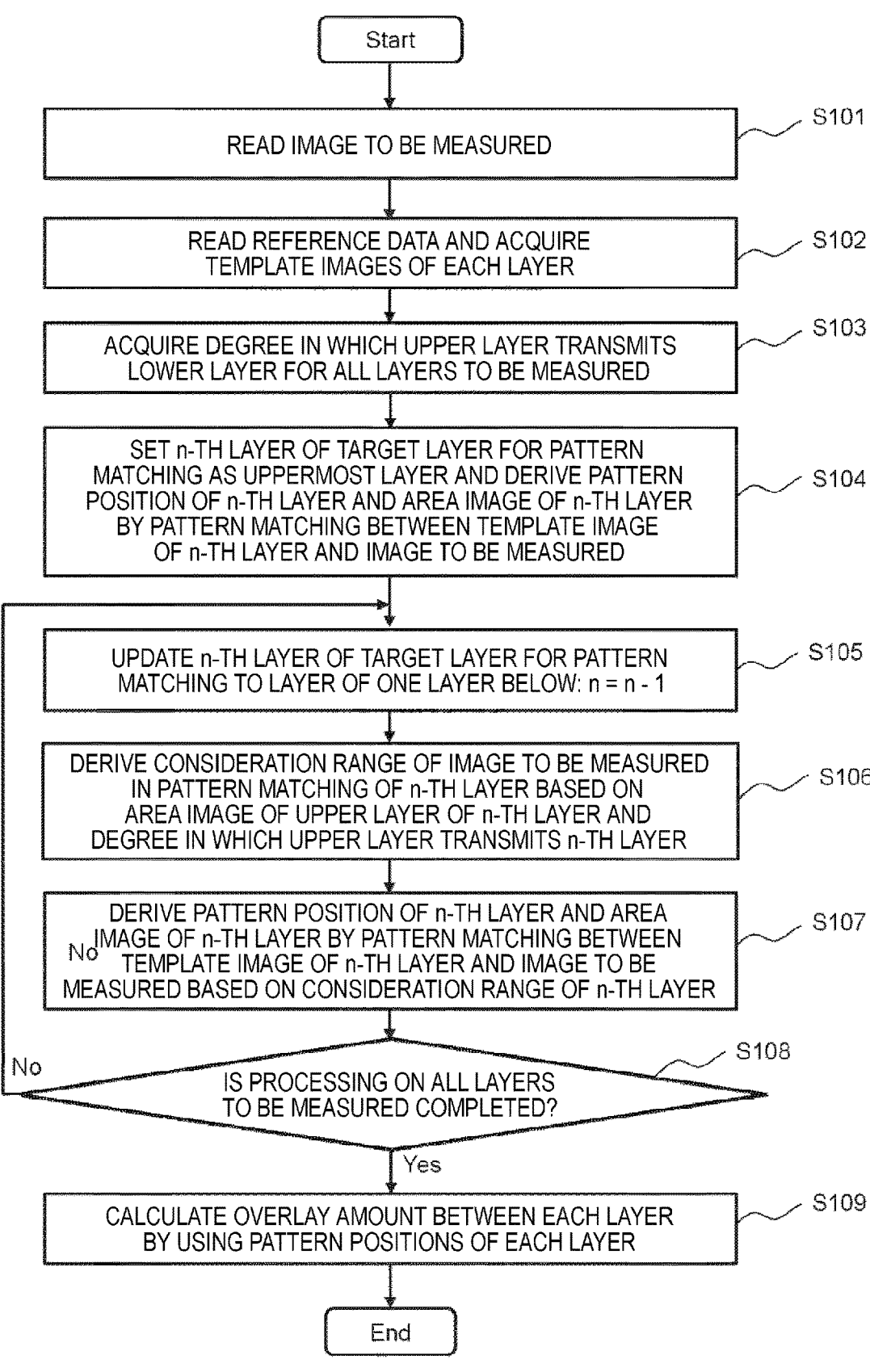
FIG. 6 is a flowchart illustrating the overlay measurement processing of Example 1.

FIG. 6 is a flowchart illustrating overlay measurement processing of the present example. In FIG. 6, first, the input/output unit 205 reads the image to be measured from the SEM that is the image generation device. Otherwise, the storage unit 206 stores the image to be measured and an ID associated with the image in advance, and upon receiving an input of the ID by the user with the operation unit 204, the received ID is compared with the ID in the storage unit 206, and the image to be measured associated with the ID is read (Step S101).

Next, the processor 202 reads reference data associated with the image to be measured from the storage unit 206 and acquires the template images of the upper and lower layers (Step S102). Here, the reference data is, for example, design data indicating a layout of a pattern of each layer. The template image of the upper and lower layer is a line drawing image indicating the edge of the pattern of each layer based on the design data, or an image created from design data to simulate the appearance of the image to be measured. As a simple simulation method, there is a method of painting the pattern area of each layer in the design data with the average luminance value or the like of the pattern area of each layer of the corresponding image to be measured. It is also effective to apply a Gaussian filter considering image blurring at the time of image capturing or to add fluctuations considering roughness caused by the manufacturing processing to the pattern edge portion. It is also effective to learn the conversion relationship between the design data and the image to be measured by deep learning in advance and generate a simulated image from the design data by using the learning model. Alternatively, the reference data is an addition average image of the plurality of images to be measured stored in the storage unit 206 in advance. The image to be measured generally includes an unknown overlay, but under the assumption that the overlay follows a probability distribution with a mean of zero, an image with an overlay close to zero can be obtained by addition averaging the plurality of images. When the image with the overlay close to zero is used as the reference data, for example, a method of applying the area division processing as disclosed in JP2013-168595A to the addition average image, setting the luminance of the addition average image to each of the obtained upper layer area and the obtained lower layer area, and using an image obtained by setting the luminance to zero or the luminance of the underlying area in areas other than the upper layer and other than the lower layer for the template image of the upper and lower layers is considered.

Next, the processor 202 acquires the degrees in which the upper layer transmits the lower layer for all layers to be measured (Step S103). The degree in which the upper layer transmits the lower layer is a value obtained by comparing the area in which the upper layer and the lower layer overlap each other and the area in which the upper layer and the lower layer do not overlap each other. For example, an area where the upper layer and the lower layer overlap is compared with an area where the upper layer transmits the lower layer and the upper layer and the lower layer do not overlap. The degree is a binary value, in which the degree is 1 if the lower layer is sufficiently seen, and the degree is 0 if the lower layer is hardly seen and the upper layer does not transmit the lower layer. That is, the degree in which the upper layer transmits the lower layer relates to an area where the upper layer covers the lower layer and is a value that can have an upper limit value or a lower limit value. The upper limit value means that the upper layer that covers the lower layer is not reflected on the image to be measured, and the lower limit value means that the lower layer covered with the upper layer is not reflected on the image to be measured. Otherwise, as the degree in which the upper layer transmits the lower layer, a number between 0 and 1 may be selected. That is, the degree in which the upper layer transmits the lower layer relates to an area where the upper layer covers the lower layer and may be a value that takes a value less than the upper limit value and equal to or more than the lower limit value. For example, the user recognizes the image to be measured that is displayed on the display unit 203 and visually compares the area where the upper layer and the lower layer overlap with each other, and the area where the upper layer and lower layer do not overlap with each other. If the upper layer transmits the lower layer about half, the degree may be 0.5. By allowing the user to input the values with the operation unit 204, the processor 202 acquires the degree in which the upper layer transmits the lower layer. Alternatively, the degree in which the upper layer transmits the lower layer may be automatically obtained by using the luminance of the image to be measured. For example, when the luminance of the lower layer pattern is set to x1, the luminance of the upper layer pattern is set to x2, and a luminance of the area where the upper layer pattern and the lower layer pattern overlap each other is x, the luminance x is a real value a in case of a linear expression represented by a linear sum such as Expression x=α(x1+x2) or Expression x=α*x1+x2. The real value a may be automatically calculated by the processor 202 by using x1 and x2 according to the linear expression when the user inputs the luminances x1 and x2 of each layer with the operation unit 204. Here, the luminances x1 and x2 of each layer may be obtained by allowing the user to observe the image to be measured and design data displayed on the display unit 203 and to perform position adjustment to match the design data to the pattern of each layer of the image to be measured with the operation unit 204.

Figures 7, 8:
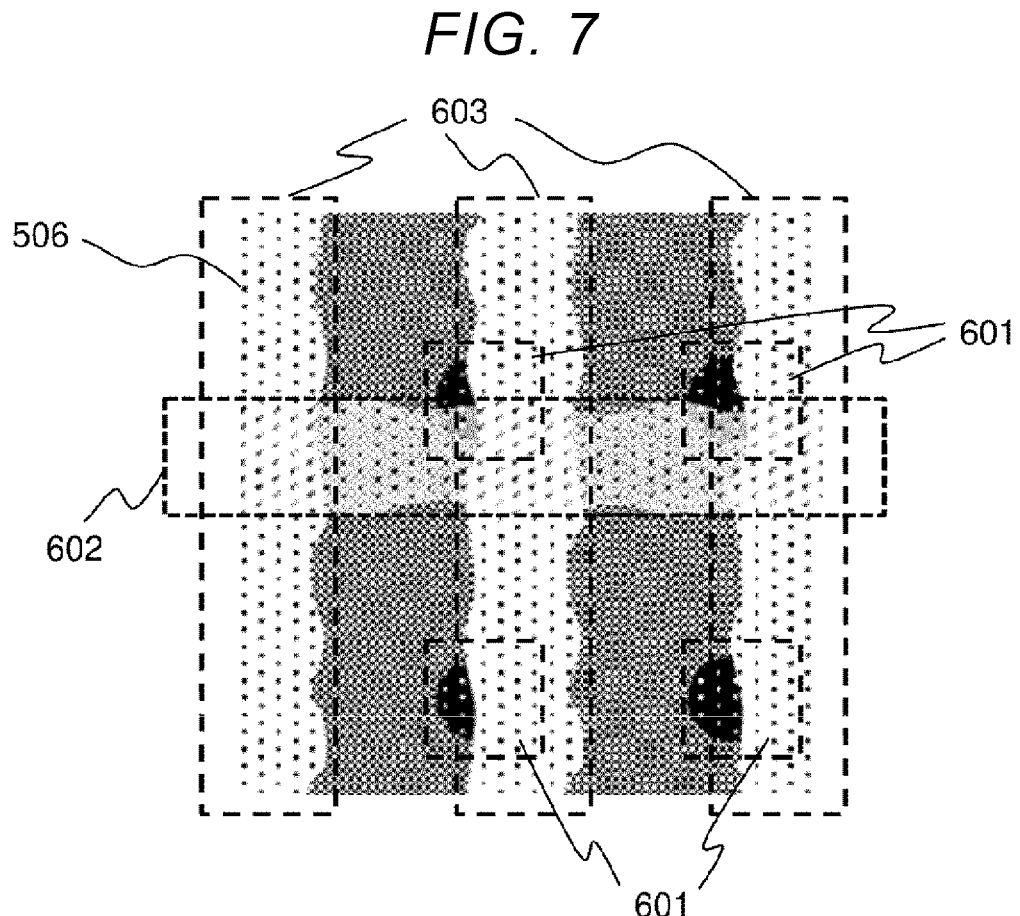
FIG. 7 is a diagram illustrating an example for aligning design data or the like to the image to be measured of FIG. 5B.
FIG. 8 is a diagram illustrating a degree in which layers transmit through each other in the image to be measured of FIG. 5B.

FIG. 7 is a diagram illustrating an example for aligning the design data to the image to be measured of FIG. 5B. In FIG. 7, design data 603 of the upper layer is aligned to the pattern of the upper layer, design data 602 of a middle layer is aligned to the pattern of the middle layer, and design data 601 of the lower layer is aligned to the pattern of the lower layer with respect to an example image to be measured 506 illustrated in FIG. 5B. As such, the average, the mode, and the like of the luminance in each pattern area of the design data aligned with the pattern of each layer are obtained as the luminances x1 and x2 of each layer and the luminance x of the overlapping area of the upper layer and the lower layer. The degree a in which the upper layer transmits the lower layer may be calculated according to the linear expression by using the luminances x1 and x2 obtained as such. Here, the design data is data indicating the pattern layout of each layer to be measured. The data is, for example, electron data indicating an edge of a circuit pattern that is created with a line segment when a circuit pattern to be measured is designed by computer aided design (CAD). Such design data may be stored in association with the image to be measured in the storage unit 206 in advance and be read together with the image to be measured at the time of ID comparison. Here, instead of the design data, a length measurement cursor used for measurement of dimensions such as a pattern width may be used. The length measurement cursor is generally recorded in the dimension measurement condition data of the pattern. Therefore, the storage unit 206 may store the dimension measurement condition data, and the user may read and use the data by inputting an ID associated with the data with the operation unit 204. Instead of the design data, the user may dispose a rectangular cursor or the like in a pattern for each layer with the operation unit 204 while observing the image to be measured displayed on the display unit 203. Alternatively, the degree in which the upper layer transmits the lower layer may be a physically calculated value. For example, the transmittance may be calculated by using a desk calculation or an electron beam simulator from information such as structural information of the sample including the material and thickness of each layer and the energy of the electron beam. That is, as described above, the degree in which the upper layer transmits the lower layer may be input by the user through the GUI or may be calculated by the processor.

By the above processing (Step S103), the processor 202 acquires the degree in which the upper layers transmits the lower layer for all layers. Hereinafter, the degree in which the upper layer transmits the lower layer for all layers are referred to as a degree of transmission between layers. With respect to the three-layered sample illustrated in FIGS. 5A and 5B, degree of transmission between layers 701 are shown in FIG. 8. In case of a three-layered structure, the degree of transmission between layers is indicated by three variables of a degree in which a third layer transmits a second layer, a degree in which a third layer transmits a first layer, and a degree in which a second layer transmits a first layer. In the case of a sample with N layers in total, the degree of transmission between layers is represented by the number of variables indicated by Expression (1) below.

[Expression 1]

$$\sum_{i=1}^{N}(i-1) \qquad (1)$$

The degree of transmission between layers is displayed on the GUI screen and can be edited by the user. Thereby, the user can confirm whether the automatically calculated degree of transmission between layers is a proper value and can correct the value, if necessary.

Next, the processor 202 performs overlay measurement processing by pattern matching based on the image to be measured, the template image of each layer, and the degree of transmission between layers read in Steps S101 to S103 (Steps S104 to S109).

Figure 9:
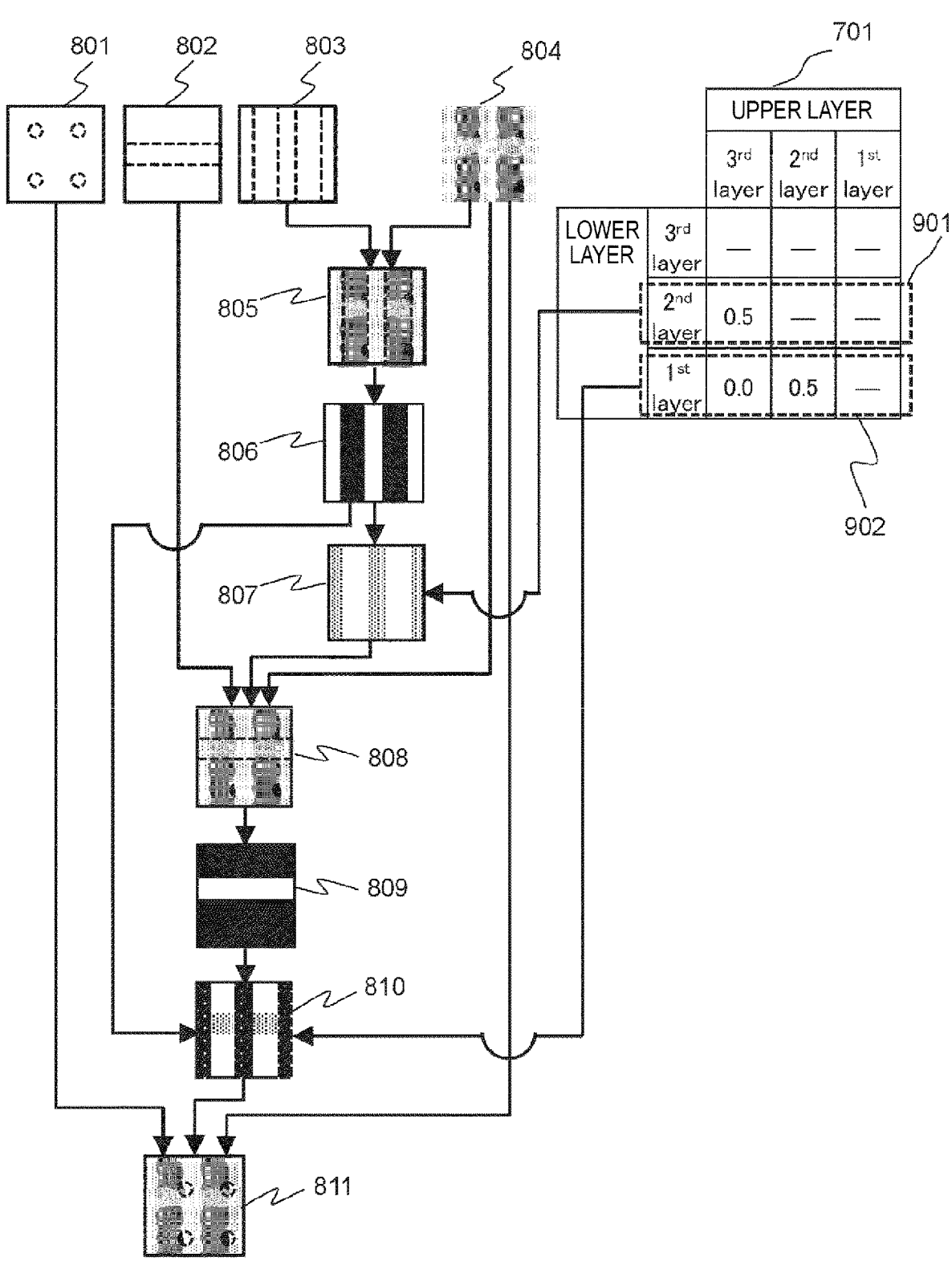
FIG. 9 is a diagram illustrating a flow of the overlay measurement processing on the image to be measured of FIG. 5B and intermediate processed images.

FIG. 9 is a diagram illustrating a flow of overlay measurement processing on the image to be measured of FIG. 5B and intermediate processed images. Hereinafter, the procedure of overlay measurement processing in the present example is described below with reference to FIGS. 6 and 9.

In FIG. 9, first, the processor 202 sets the third layer that is the uppermost layer as the target layer for pattern matching and performs pattern matching of the third layer with a template image 803 of the third layer and an image to be measured 804 (Step S104 of FIG. 6). Accordingly, a matching result 805 of the third layer and a pattern position of the third layer are obtained. An area image 806 of the third layer that is an area to be recognized as the third layer is obtained from the matching result 805 of the third layer. The area image 806 of the third layer is an image having a luminance value 255 in an area recognized as the third layer and having a luminance value of 0 in other areas. As a method of obtaining the area image 806 of the third layer, if the template image of the third layer is, for example, an image generated from the design data, an area that is within an area of the third layer in the original design data and an area of the area that is subjected to expansion or contraction processing are recognized as the area of the third layer. Alternatively, the area of the third layer may be obtained by subjecting the template image of the third layer to area extraction processing using threshold processing by luminance or the like. Alternatively, an area with a pattern matching score equal to or higher than a certain threshold may be recognized as the area of the third layer.

Next, the processor sets the second layer that is one layer below as the target layer for pattern matching (Step S105) and derives a consideration range 807 of the image to be measured used for the pattern matching of the second layer by using the area image 806 of the third layer that is the upper layer than the second layer and a degree in which the upper layer transmits the second layer 901 that is acquired by the degree of transmission between layers 701 input in Step S102 (Step S106).

Hereinafter, the consideration range of the image to be measured used for the pattern matching of an n-th layer is referred to as an n-th layer consideration range. The second layer consideration range 807 is represented by data having the same number of pixels as the image to be measured and is an image having a value of 0.5 in the area of the third layer and having a value of 1 in the other areas, as the degree in which the third layer transmits the second layer in case of the present example. The luminance of the image may actually take an integer equal to or greater than 0 and equal to or less than the maximum integer (for example, 255). Here, the degree may be adjusted that the value 1 described above corresponds to the largest integer. From a different point of view, the consideration range can be said to indicate the degree of consideration for each pixel when performing pattern matching processing and thus may be referred to as a weight map.

Next, a matching result 808 of the second layer by performing the pattern matching of the second layer is obtained by using the second layer consideration range 807, a template image 802 of the second layer, and the image to be measured 804, and then an area image 809 of the second layer that is an area recognized as the second layer is obtained like in the case of the third layer (Step S107).

Specifically, as the method of calculating a pattern matching, for example, zero-mean normalized cross-correlation (ZNCC) is used. An example of an expression for calculating a matching score in the present example using the second layer consideration range 807 and ZNCC in Step S107 in Expression (2) below is provided.

[Expression 2]

$$\text{Score}(x, y) = \frac{\sum\sum\left((f(x + dx, y + dy) - \overline{f})(g(x, y) - \overline{g})w(x, y)\right)}{\sqrt{\sum\sum(f(x + dx, y + dy) - \overline{f})^2 \sum\sum((g(x, y) - \overline{g})w(x, y))^2}} \quad (2)$$

Here, f(x, y) is a template image, g(x, y) is an image to be measured, and w(x, y) is a consideration range. f(x, y), g(x, y), and w(x, y) indicate images, and x and y indicate coordinates of pixels that configure the images. dx and dy indicate the number of pixels shifted in the x and y directions when calculating the score. $\overline{f}$ (overline) and $\overline{g}$ (overline) are the average values of the images f(x, y) and g(x, y), respectively. The matching score according to Expression (2) described above is calculated within the ranges of dx and dy given in advance, that is, within the search range of pattern matching, and dx and dy that makes the score a maximum value are calculated as the positions of the target pattern. As the score calculation expression, other than the ZNCC, the sum of the absolute values of the differences between the pixel values of the template image and the image to be measured, or the sum of the squared values of the differences between the pixel values of the template image and the image to be measured may be used.

Next, if there is still a layer to be measured, such as the first layer illustrated in FIG. 9 (Step S108), the processor sets the first layer, which is one layer below, as the target layer for pattern matching (Step S105). A first layer consideration range 810 is derived by using the area image 806 of the third layer and the area image 809 of the second layer that are upper layers than the first layer, and a degree in which the upper layers transmit the first layer 902 that is acquired from the degree of transmission between layers 701 (Step S106). Similarly to the second layer consideration range 807, the first layer consideration range 810 is an image having a value of 0.0 as the degree of the third layer transmits the first layer in the area of the third layer in the present example, and having a value of 0.5 as the degree in which the second layer transmits the first layer in the area of the second layer in the present example. In the overlapping area of the third layer and the second layer, it is required to separately derive the degree in which the overlapping area of the third layer and the second layer transmits the first layer. As a derivation method, for example, a minimum value or a product of both a degree in which the third layer transmits the first layer and a degree in which the second layer transmits the first layer may be considered. This is because, in general, the more layers are overlapped, the less reflected electrons are obtained from the lower layer, and the signal of the pattern of the lower layer on the image becomes smaller. As another derivation method, the minimum value, the product, or the like of both the degree in which the third layer transmits the second layer and the degree in which the second layer transmits the first layer can be also considered.

A matching result 811 of the first layer and a pattern position of the first layer are obtained by performing pattern matching of the first layer by using the first layer consideration range 810, a template image 801 of the first layer, and the image to be measured 804 (Step S107). The pattern position of the first layer is calculated by performing score calculation as shown in Expression (2) above.

When the processing is completed for all layers to be measured (Step S108), overlay amounts between each layer are finally calculated by using the pattern position of each layer (Step S109).

According to the above processing, the success rate of the pattern matching of each layer using the complicated multi-layer structure pattern as the target and the success rate of the overlay measurement based on the pattern matching can be improved by adaptively performing pattern matching calculation as shown in Expression (2) by using the consideration range of each layer based on the area of each layer and the degree of transmission between layers.

In the present example, as illustrated in FIGS. 6 and 9, an example in which the pattern matching is performed sequentially from the upper layer is provided. In general, the higher the layer, the more reflected electrons are detected when electron beams are irradiated, and the luminance and a signal to noise ratio (S/N ratio) tend to increase on the image to be measured. Therefore, it is considered an effective method to perform pattern matching sequentially from the upper layer. However, the luminance of the image to be measured varies not only with the height of each layer but also with the structure of the sample such as holes and trenches and the material of the sample. In particular, when metal wiring is formed in the lower layer, there are cases where the luminance and S/N ratio of the metal wiring pattern of the lower layer are higher than the pattern of the upper layer. Here, the pattern matching processing is not necessarily performed in order from the upper layer, but may be performed from the lower layer having the higher luminance and S/N ratio.

In the present example, a sample having a three-layer structure is described, but the layer structure is not limited to three layers and can be applied to a plurality of layers having an arbitrary number of layers. The overlay between continuous layers is described in the present example, but the overlay error between discontinuous layers may be measured.

Example 2

In the present example, a GUI for performing the overlay measurement provided in Example 1 is described.

Figure 10:
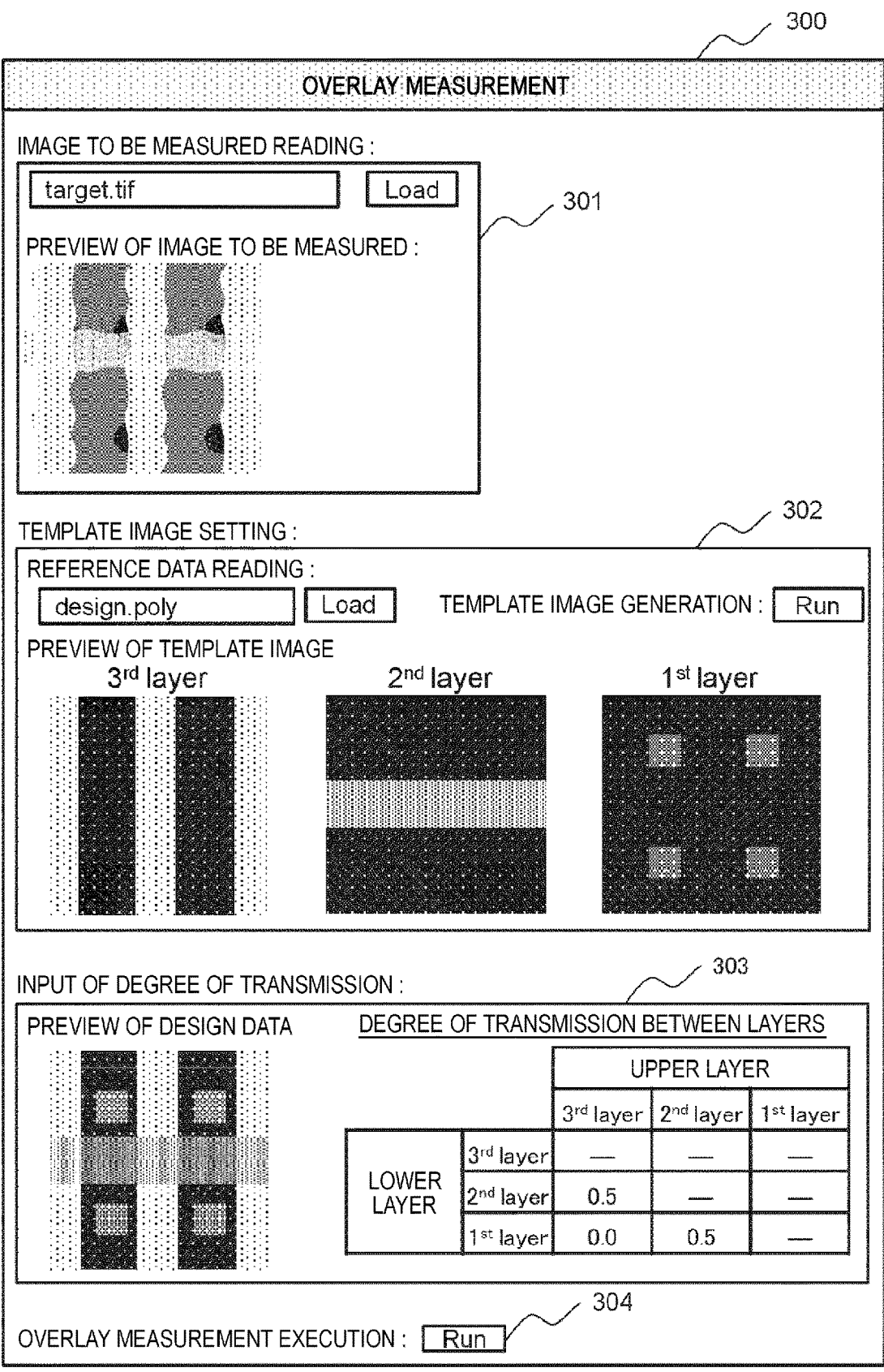
FIG. 10 is a diagram illustrating an example of a GUI screen for setting an automatic adjustment function of an image capturing condition and an image processing condition in Example 2.

FIG. 10 is a diagram illustrating an example of a GUI screen for setting an automatic adjustment function of an image capturing condition and an image processing condition in the present example. In FIG. 10, an ID input box and a preview box 301 of the image to be measured described in Example 1 (Step S101), a box 302 for acquiring a template image of each layer from the reference data (Step S102), a box 303 for inputting and displaying a degree of transmission between layers (Step S103), and a button 304 for performing overlay measurement by using the input image to be measured, the template image of each layer, and the degree of transmission (Steps S104 to S109) are displayed in an overlay measurement box 300 on a screen.

According to the present example, it is possible to designate items that require user input for performing the overlay measurement described in Example 1.

Although the examples according to the present invention are described above, the present invention has the effect of improving the success rate of pattern matching of each layer using a complicated multi-layer structure pattern as a target and the success rate of overlay measurement based the pattern matching. Therefore, the present invention contributes to achievement in a high level of economic productivity through technological improvement and innovation, especially in Goal 8, "decent work and economic growth" for realizing the sustainable development goals (SDGs).

The present invention is not limited to the above described examples and includes various modifications. For example, in the components of the overlay measurement device, the input/output unit 205 may be an input/output interface, the operation unit 204 may be a keyboard or a touch panel, and the storage unit 206 may be a storage medium such as a semiconductor memory or a hard disk. The processor 202 includes a microprocessor, a central processing unit (CPU), a graphics processing unit (GPU), a field programmable gate array (FPGA), a quantum processor, or any other semiconductor device capable of computing. The overlay measurement device including the control unit 201 including the processor 202 can be, for example, a computer such as a personal computer, a tablet terminal (computer), a smartphone, a server computer, a blade server, or a cloud server, or a collection of computers. The overlay measurement device may have a plurality of components described above. An example thereof is a collection of a plurality of computers. The overlay measurement device may share some or all hardware with the control device 1120. The overlay measurement program may be stored in a non-volatile memory medium that can be read by the computer. Here, the overlay measurement program is executed by the processor by reading the overlay measurement program from the medium.

The examples above described are described in detail to explain the present invention in an easy-to-understand manner and are not necessarily limited to those having all the described configurations.

What is claimed is:

1. A semiconductor observation system comprising:
a microscope and a processor that measures an overlay between a first layer that is a certain layer of a sample formed with two or more layers and a second layer that is one or more layers above the first layer, wherein
the processor
acquires an image of the sample that is captured by the microscope,
acquires a first degree that indicates a degree in which the second layer overlaps the first layer,
acquires a first layer template image indicating a pattern shape of the first layer and a second layer template image indicating a pattern shape of the second layer,
performs pattern matching processing of the second layer based on the second layer template image and the acquired image to acquire a second position deviation amount related to the second layer and an area recognized as the second layer on the acquired image, the second position deviation amount being a position deviation amount between the second layer template image related to the second layer and the acquired image,
determines a first layer consideration range that is a range of pixels of the acquired image considered in pattern matching processing of the first layer based on the first degree and the area recognized as the second layer,
performs pattern matching processing of the first layer based on the first layer consideration range, the first layer template image, and the acquired image, to acquire a first position deviation amount related to the first layer and an area recognized as the first layer on the acquired image, the first position deviation amount being a position deviation amount between the first layer template image related to the first layer and the acquired image, and
measures an overlay based on the second position deviation amount and the first position deviation amount.

2. The semiconductor observation system according to claim 1, wherein
the sample includes a third layer that is one or more layers below the first layer, and
the processor
acquires a second degree indicating a degree in which each layer of the second layer and the first layer overlaps the third layer,
acquires a third layer template image indicating a pattern shape of the third layer,
determines a third layer consideration range that is a range of pixels of the acquired image considered in pattern matching processing of a third layer based on the second degree, an area recognized as the first layer, and an area recognized as the second layer,
performs pattern matching processing of the third layer based on the third layer consideration range, the third layer template image, and the acquired image to acquire a third position deviation amount related to the third layer and an area recognized as the third layer on the acquired image, the third position deviation amount being a position deviation amount between the third layer template image related to the third layer and the acquired image, and
measures an overlay based on the third position deviation amount, the first position deviation amount, and the second position deviation amount.

3. The semiconductor observation system according to claim 1, wherein
the first degree is a value that can be a value of at least less than an upper limit value and equal to or more than a lower limit value, and
relates to an area where the second layer covers the first layer,
the upper limit value means that the second layer that covers the first layer is not reflected on the acquired image, and
the lower limit value means that the first layer covered with the second layer is not reflected in the acquired image.

4. The semiconductor observation system according to claim 1, wherein
the first degree is a value that can be an upper limit value or a lower limit value, and
relates to an area where the second layer covers the first layer,
the upper limit value means that the second layer that covers the first layer is not reflected on the acquired image, and
the lower limit value means that the first layer covered with the second layer is not reflected on the acquired image.

5. The semiconductor observation system according to claim 1, wherein
the first degree is a real value a when luminance x of an area where the second layer and the first layer overlap each other in the acquired image is indicated by a linear sum using luminance x1 of the first layer, luminance x2 of the second layer, and a coefficient α.

6. The semiconductor observation system according to claim 1, wherein the second layer template image and the first layer template image are design data having layout information of a pattern of each layer of the sample.

7. The semiconductor observation system according to claim 1, wherein the second layer template image and the first layer template image are at least one of the following:

a line drawing image generated based on design data having area information of a pattern of each layer of the sample, and an image created by simulating an appearance of the acquired image based on the design data.

8. The semiconductor observation system according to claim 1, wherein the second layer template image and the first layer template image are generated based on image averaging of a plurality of acquired images.

9. The semiconductor observation system according to claim 1, wherein the second layer template image and the first layer template image are images obtained by performing layer recognition processing by using luminance information with respect to an image generated based on image averaging of a plurality of acquired images to separate the images into second layers and first layers.

10. The semiconductor observation system according to claim 1, wherein the first layer consideration range is represented by data having the same number of pixels as the acquired image, and each pixel has a value corresponding to the first degree.

11. The semiconductor observation system according to claim 1, wherein the pattern matching processing includes calculating a matching score based on a normalized cross-correlation value between the acquired image and the first layer template image over the range of the pixels of the acquired image to calculate a position where the matching score becomes maximum as a pattern position.

12. The semiconductor observation system according to claim 1, wherein the first degree is indicated by a luminance change caused by etching of the sample.

13. The semiconductor observation system according to claim 1, wherein arrangement of the second layer and the first layer is not from the upper layer to the lower layer, but from the lower layer to the upper layer, and the pattern matching processing is performed from the lower layer to the upper layer.

14. The semiconductor observation system according to claim 1, wherein the first degree is displayed on a graphical user interface (GUI) screen and can be confirmed and edited by a user.

15. An overlay measurement method performed by a processor that measures an overlay between a first layer that is a certain layer of a sample formed with two or more layers and a second layer that is one or more layers above the first layer, the method comprising:

acquiring an image of the sample;

acquiring a first degree that indicates a degree in which the second layer overlaps the first layer;

acquiring a first layer template image indicating a pattern shape of the first layer and a second layer template image indicating a pattern shape of the second layer;

performing pattern matching processing of the second layer based on the second layer template image and the acquired image to acquire a second position deviation amount related to the second layer and an area recognized as the second layer on the acquired image, the second position deviation amount being a position deviation amount between the second layer template image related to the second layer and the acquired image;

determining a first layer consideration range that is a range of pixels of the acquired image considered in pattern matching processing of the first layer based on the first degree and the area recognized as the second layer;

performing pattern matching processing of the first layer based on the first layer consideration range, the first layer template image, and the acquired image, to acquire a first position deviation amount related to the first layer and an area recognized as the first layer on the acquired image, the first position deviation amount being a position deviation amount between the first layer template image related to the first layer and the acquired image; and measuring an overlay based on the second position deviation amount and the first position deviation amount.

16. The overlay measurement method according to claim 15, wherein the sample includes a third layer that is one or more layers below the first layer, a second degree indicating a degree in which each layer of the second layer and the first layer overlaps the third layer is acquired, a third layer template image indicating a pattern shape of the third layer is acquired, a third layer consideration range that is a range of pixels of the acquired image considered in pattern matching processing of a third layer based on the second degree, an area recognized as the first layer, and an area recognized as the second layer is determined, pattern matching processing of the third layer is performed based on the third layer consideration range, the third layer template image, and the acquired image to acquire a third position deviation amount related to the third layer and an area recognized as the third layer on the acquired image, the third position deviation amount being a position deviation amount between the third layer template image related to the third layer and the acquired image, and an overlay is measured based on the third position deviation amount, the first position deviation amount, and the second position deviation amount.

17. The overlay measurement method according to claim 15, wherein the first degree is a value that can take a value of at least less than an upper limit value and equal to or more than a lower limit value, and relates to an area where the second layer covers the first layer, the upper limit value means that the second layer that covers the first layer is not reflected on the acquired image, and the lower limit value means that the first layer covered with the second layer is not reflected in the acquired image.

18. The overlay measurement method according to claim 15, wherein the first degree is a value that can be an upper limit value or a lower limit value, and relates to an area where the second layer covers the first layer, the upper limit value means that the second layer that covers the first layer is not reflected on the acquired image, and the lower limit value means that the first layer covered with the second layer is not reflected on the acquired image.

19. The overlay measurement method according to claim 15, wherein the first degree is a real value a when luminance x of an area where the second layer and the first layer overlap each other in the acquired image is indicated by a linear sum using luminance x1 of the first layer, luminance x2 of the second layer, and a coefficient $\alpha$.

20. The overlay measurement method according to claim 15, wherein the second layer template image and the first layer template image are design data having layout information of a pattern of each layer of the sample.

* * * * *